(No Model.) 6 Sheets—Sheet 1.
H. TUTTLE.
GRAIN BINDER.

No. 547,695. Patented Oct. 8, 1895.

Fig. 1.

Witnesses:
Harry L. Anver
I. J. Masson

Inventor:
Hosmer Tuttle,
by E.E. Masson
atty.

(No Model.) 6 Sheets—Sheet 2.

H. TUTTLE.
GRAIN BINDER.

No. 547,695. Patented Oct. 8, 1895.

Witnesses:
Harry L. Amer
I. J. Masson

Inventor:
Hosmer Tuttle
by E. E. Masson
atty.

(No Model.) 6 Sheets—Sheet 3.

H. TUTTLE.
GRAIN BINDER.

No. 547,695. Patented Oct. 8, 1895.

Fig. 3

Witnesses:
Harry L. Ames.
I. J. Masson

Inventor:
Hosmer Tuttle
by E. E. Masson
atty.

(No Model.) H. TUTTLE. 6 Sheets—Sheet 4.
GRAIN BINDER.

No. 547,695. Patented Oct. 8, 1895.

Witnesses
Harry L. Amer.
J. J. Masson

Inventor
Hosmer Tuttle,
by E.E. Masson
atty.

(No Model.)  H. TUTTLE.  6 Sheets—Sheet 5.
GRAIN BINDER.

No. 547,695.  Patented Oct. 8, 1895.

Witnesses:
Harry L. Ames
I. J. Masson

Inventor
Hosmer Tuttle,
by E. E. Masson
atty.

(No Model.) 6 Sheets—Sheet 6.

H. TUTTLE.
GRAIN BINDER.

No. 547,695. Patented Oct. 8, 1895.

Witnesses:
Harry L. Amer.
I. J. Masson

Inventor:
Hosmer Tuttle,
by E. E. Masson
atty.

UNITED STATES PATENT OFFICE.

HOSMER TUTTLE, OF CEDAR RAPIDS, IOWA.

GRAIN-BINDER.

SPECIFICATION forming part of Letters Patent No. 547,695, dated October 8, 1895.

Application filed June 30, 1888. Serial No. 278,715. (No model.)

*To all whom it may concern:*

Be it known that I, HOSMER TUTTLE, a citizen of the United States of America, residing at Cedar Rapids, in the county of Linn and State of Iowa, have invented certain new and useful Improvements in Straw-Band Grain-Binders, of which the following is a specification, reference being had therein to the accompanying drawings.

This invention relates to improvements in straw-band grain-binders; and the objects of my improvement are to produce a simple and effective mechanism for binding gavels of grain with straw, as will be fully hereinafter described, and specifically set forth in the claims. I accomplish these objects by the construction shown in the accompanying drawings, in which—

Fig. 2 is a side elevation of the binder on a larger scale with the platform removed. Fig. $2^a$ is a diagram of the path traveled by the straw band before reaching the needle. Fig. $2^b$ is a top view of the rear upper casting and part of the U-shaped frame.
Fig. 4 is a rear view, partly in section, of the needle, the trip, and knotting mechanism, showing the position of the band in the knotter ready for twisting, the grasper having just cut and released the band.
Fig. 5 is a rear view of the knotter-fork and its support with the band and its ends twisted one turn and a half;
Fig. 6, a rear view of the knotter-fork and its support with the band and its ends twisted and tucked under said band.
Fig. 7 is a side view of the tucked ends still on the knotter-fork.
Fig. 12 is a front view of the trip and knotting mechanism. Fig. $12^a$ is a front view of the cam that operates the guard of the knotter-fork.
Fig. 13 is a top view of the binding mechanism with the driving-wheel and end casting on the head of the frame in section. Fig. $13^a$ is a top view of the breast-plate, the sliding grasper $b^3$ for the grain band, and the movable jaw $b^4$, provided with a stem carrying a spring coiled thereon, said stem passing loosely through a lug projecting from the top of the breast-plate, said lug constituting the pivot for the tilting jaw $b^4$.

In said drawings, A represents the inclined binding-table attached at the inner side thereof to the elevator-frame $A^2$ and supported at the outer side thereof by means of braces $A^3$, secured to the under side of said platform at one end and having their other end attached to the tubular rail $A^4$, secured to a standard $A^5$, resting upon the sill of the harvester. Said standard has its upper end connected to a brace $A^6$, secured also to the elevator-frame. A rail $A'$ supports the inner end of the platform A. The platform A is slotted at $a$ for the passage of the packer-arms $a^2$. The latter are in the form of rods, having an eye $a^3$ at the inner end, an eye $a^4$ at the outer end, and an upward bend $a^5$ between the two ends. The outer end of each packer having the eye $a^4$ is adapted to slide upon a guide-rod $a^6$, secured at one end to the under side of the platform. Said guide-rod is substantially in a horizontal position, and as the platform is in an inclined position it will cause the bent portion $a^5$ of the packer-arm to ascend through the slot $a$ in said platform when said arm is slid along its guide-rod $a^6$. Said guide-rod $a^6$ can be bent or set at a suitable angle under the platform to give the necessary rise to the packer-arm. The portion of the packer-arm between its bend $a^5$ and its eye $a^4$ is substantially at a right angle to the platform and is preferably slightly concave toward the bundle forming and discharging mechanism. The eye $a^3$ of each packer-arm is journaled upon a crank $a^7$, formed upon the shaft $a^8$, having a sprocket-wheel $a^9$, operated by means of a chain $a^{10}$, passing also around a double sprocket-wheel $a^{12}$ upon the pitman-shaft or any other suitable shaft of the machine.

Over the platform A is mounted the grain-binding mechanism, the frame of which has its lower end $B^2$ bolted to said platform, and also at B' to the upper end of the braces A³. The frame is in the form of a letter U laid on its side. It consists of two parallel tubes B³, extending horizontally and forming with the casting $b^8$ the head of the frame. Two tubes B⁴, standing vertically, and two horizontal tubes B⁵ forming the lower member complete the frame. One end of each of the tubes B³ is united to the upper end of one of the vertical tubes B⁴ by angle-castings B⁶, and the two tubes B⁵ are united to the lower ends of the tubes B⁴ by angle-castings B², the latter forming also the base of the frame of the binding mechanism. To stiffen the portion of the frame formed by the vertical tubes B⁴ a tube B⁸ is mounted vertically between the angle-castings B⁶ and B², and a bolt B⁹ passing through said tube B⁸ clamps said castings firmly together. The upper angle-castings B⁶ have bearings for the main shaft C of the grain-binding mechanism, said shaft carrying the clutch that is operated by the trip or starting and stopping mechanism when the necessary amount of grain for a gavel has been collected, and which will be described hereinafter. The upper angle-casting B⁶ carries also the bearings for the shaft D, that carries the operating devices for the knotting mechanism for opening the clutch, for operating the needle, and for operating the take-up of the band, and said shaft revolves one revolution for each bundle produced.

The shaft C has motion transmitted thereto from the packer crank-shaft $a^8$ by means of a sprocket-wheel upon said shaft $a^8$, a sprocket-wheel C² upon the shaft C, and a chain C³ C, connecting said sprocket-wheels.

Figure 1:
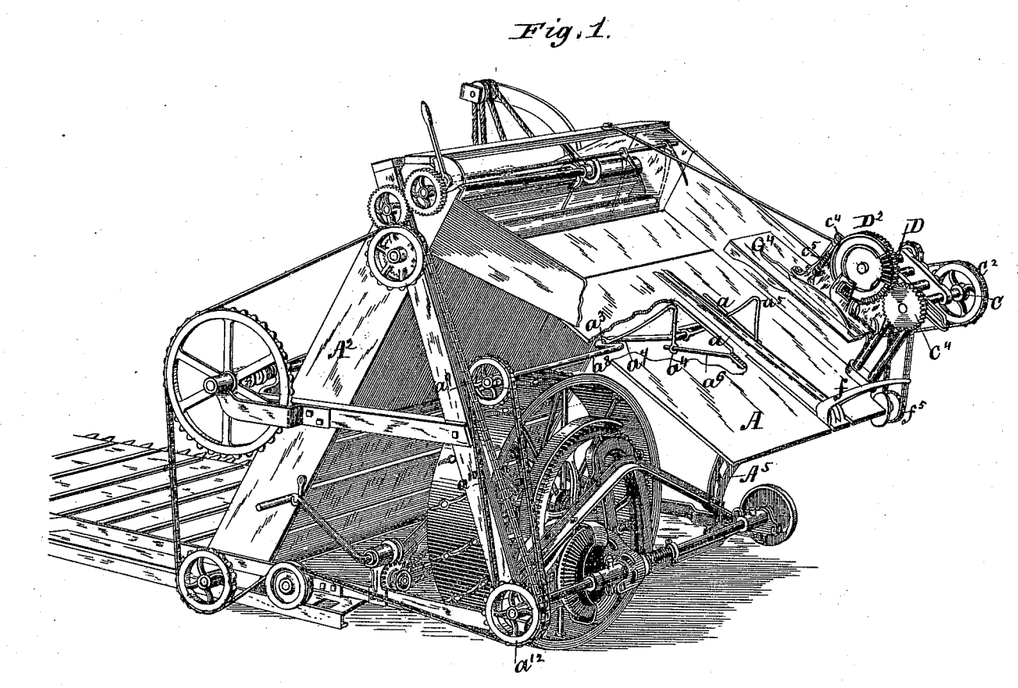
Figure 1 is a perspective view of a harvester-binder constructed in accordance with my invention.
Figures 2, 2A, 2B:
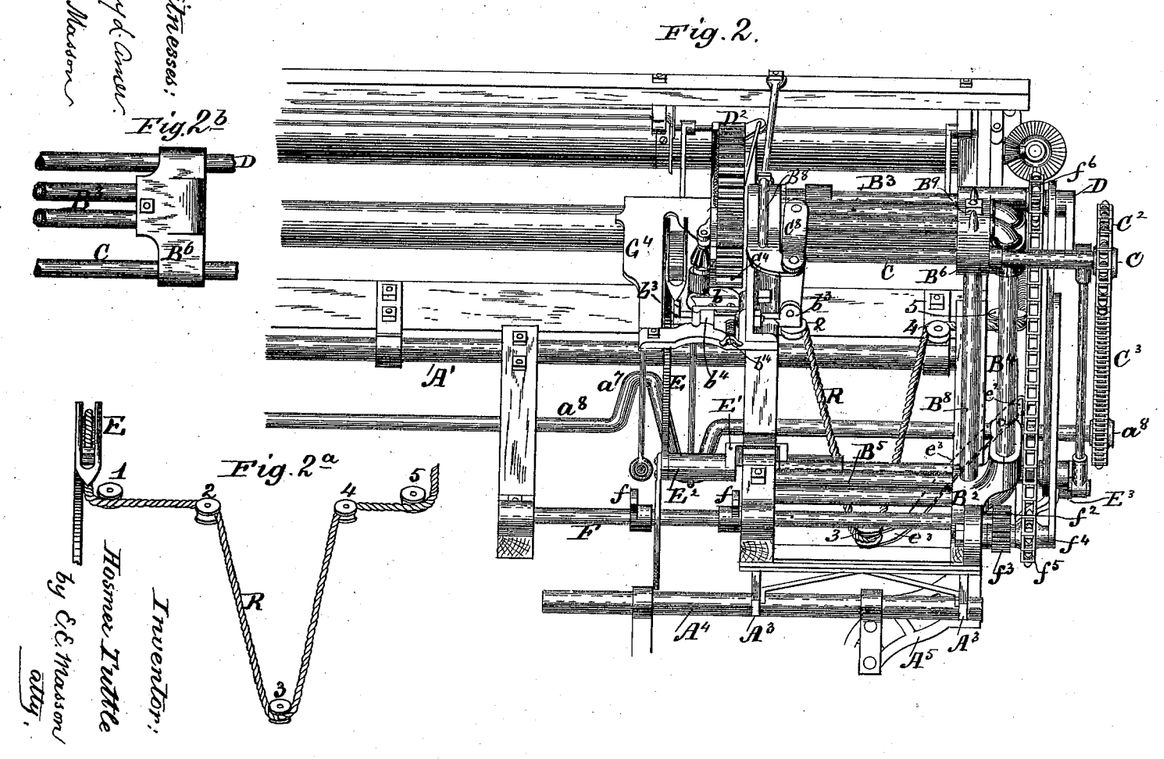
Figure 3:
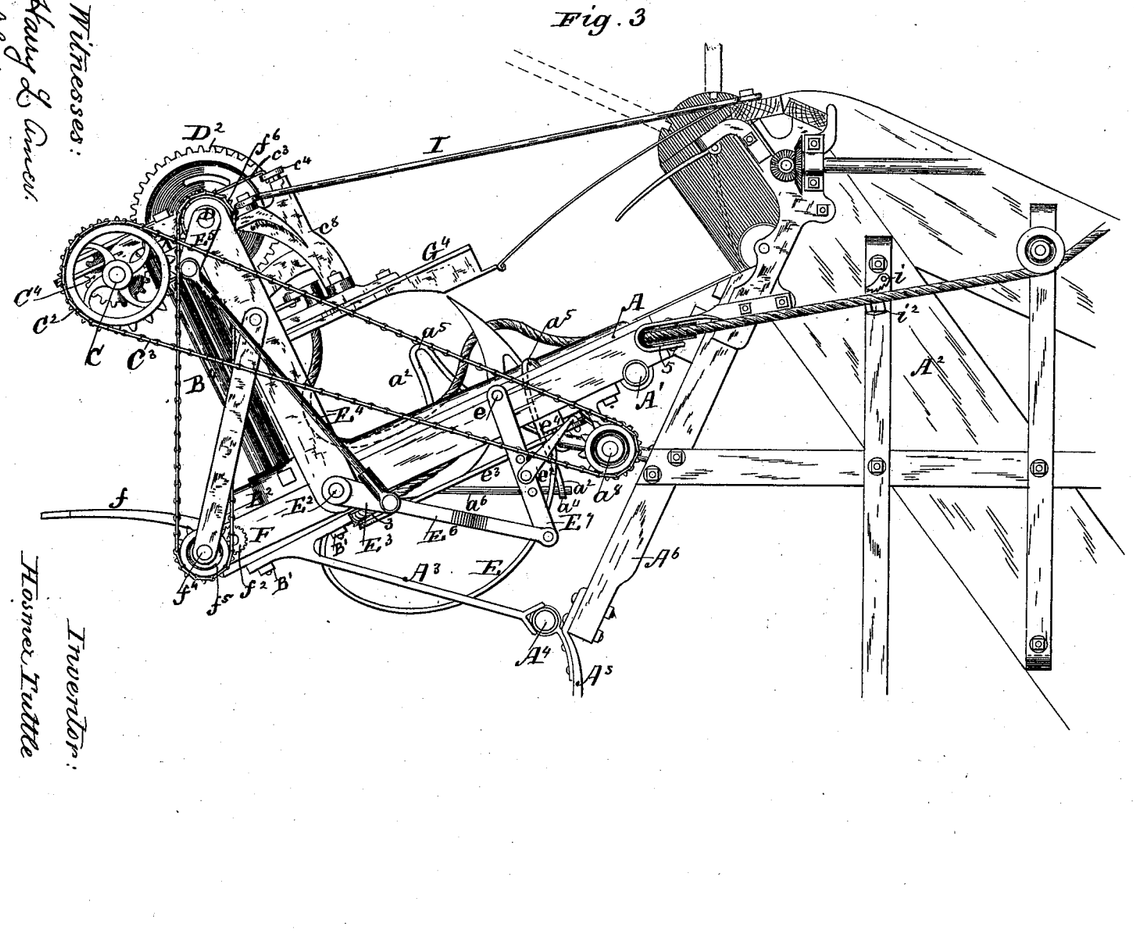
Fig. 3 is a front view of the binder.
Figures 12, 12A:
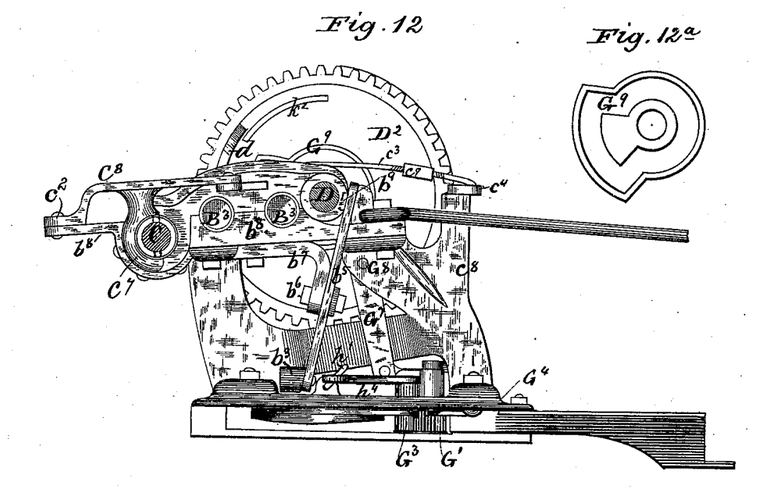
Figures 13, 13A:
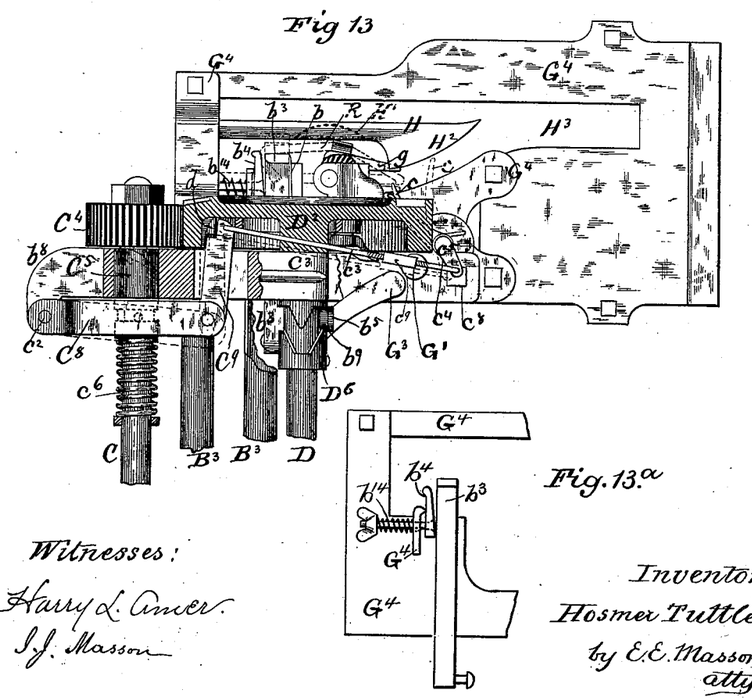

The machine is provided with a band retaining and cutting mechanism, which consists of a stationary cutter $b$, a horizontally-sliding grasper $b^3$, pivoted to one end of a pivoted lever $b^5$, Fig. 12, and a laterally-movable spring-jaw $b^4$, Fig. 13. When the machine is to be operated to bind a bundle, one end of the band R, that has been cut by the stationary cutter $b$, secured to the frame $b^2$, is retained between the sliding grasper $b^3$ and the laterally-moving jaw $b^4$ and passes within the hook of the grasper to and over the trip-finger $c$, and thence straight to the needle E, and thence passes around a series of rollers 1, 2, 3, 4, and 5, Fig. 2ª, that give thereto sufficient tension, and thence to the band-making mechanism. The jaw $b^4$ is mounted upon a spring-carrying pin $b^{14}$, passing through a bearing in the frame. When the packers have brought enough grain to give to the band the curve shown in Fig. 3, said band presses upon the trip-finger $c$ and causes it to tip or revolve laterally about one-sixth of a revolution from the position shown in dotted lines in Fig. 13 to the position shown by full lines in said figure. The needle then advances and carries the band around the gavel until said needle occupies the position shown in Fig. 4.

Figures 4, 5, 6, 7:
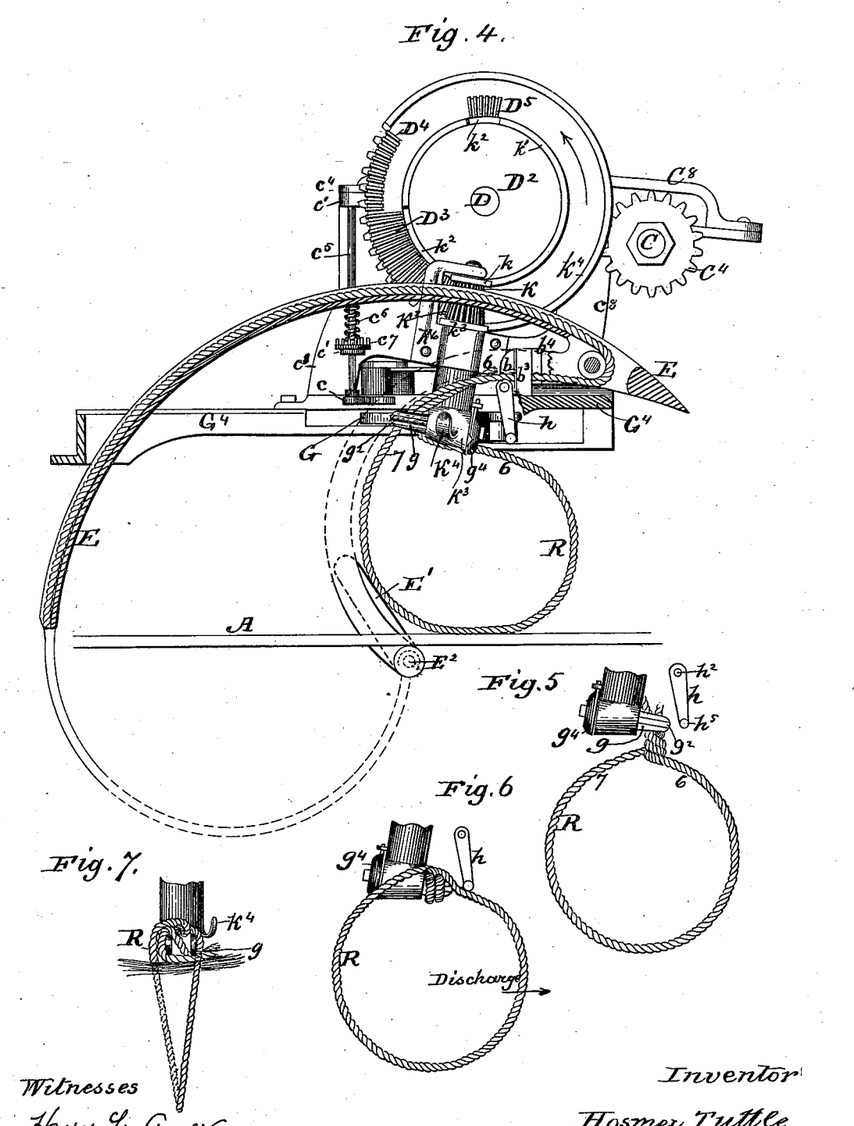

The parts above mentioned are operated as follows: The shaft C carries a pinion C⁴, that meshes with a gear-wheel D² upon the shaft D. This pinion is loose on the shaft C and carries one of the members of a clutch. The other member is on the end of a sleeve C⁵, connected by means of a feather with the shaft C, and said members of the clutch are held together by the spring C⁶ upon said shaft, one end of the spring abutting against a pin passing through said shaft, while the other end abuts against the sleeve. The sleeve has a peripheral groove, into which enters the two pins of the clutch-arm C⁷, pendent from the clutch-lever C⁸, pivoted at one end to the frame at $c^2$, and having pivoted at its opposite end a latch C⁹, one end of which enters within the periphery of the gear-wheel D², and at the proper time is forced endwise and outwardly toward the side of the said wheel by an inclined plane $d$ on said wheel, and stops the binding apparatus. The latch C⁹ is connected with a crank-arm $c^4$ upon the upper end of the shaft $c^5$ of the trip-finger $c$ by means of a rod $c^3$, the length of which is adjustable by means of the nut $c^9$, having a right and left hand thread receiving the two parts of said rod. The shaft $c^5$, carrying the trip-finger $c$ at its lower end, is retained in brackets $c'$, projecting on the side of the frame $c^8$. To cause the shaft $c^5$ to make a part of a revolution to bring the trip-finger to the position shown by dotted lines in Fig. 13 a spring $c^6$, Fig. 4, is coiled upon said shaft $c^5$ and has its upper end secured thereto and its lower end in engagement with pins on a stationary plate $c^7$, secured to one of the brackets $c'$ of the frame $c^8$, carried by the upper tubes B³ of the U-shaped frame.

The needle E is mounted upon a shaft E², carried by the lower casting of the U-shaped frame. Said shaft has an offset or lateral extension E' thereon to present a broad surface to the gavel and help to keep it straight on the table and permit the omission of a compressing-post, the band in this case serving as a compressor on the discharging side of the bundle. It also gives room for the discharging-arms $f$ to revolve with their shaft F and permit said discharging-arms to engage first with the bottom of the bundle and move in a circular path. Discharging-arms mounted under the table are preferred, as they press the bundle against the knotter mechanism and leave no loose portion under the top of the band. To oscillate the needle-shaft E² it carries at one end a crank E³, that is united by the connecting-rod E⁴ with a crank E⁵ upon the shaft D. The latter crank E⁵ is shorter than the crank E³, so that while the crank E⁵ makes a revolution with its shaft the crank E³ accomplishes only a long oscillation.

To operate the take-up while the needle-arm is swinging up around the gavel, the crank E³ has pivoted to its outer end one end of a connecting-rod E⁶, that has pivoted at its opposite end one end of a lever E⁷, having its opposite end pivoted to the frame at e, and this lever carries adjustably pivoted thereto between its two ends a connecting-rod e², that has its opposite end pivoted to one end of the take-up lever e³. Said lever is pivoted to a block e⁴, pendent from the table A, and carries at its opposite end the pulley 3, around which the band R passes.

The needle having reached nearly its highest point with the band between the knotter-jaws, the sliding grasper b³ opens out and releases the finished or first-retained end of the band and is in position to grasp a new one. The needle advances to the end of its course and lays the band within the recess of the sliding grasper, and the latter is retracted and brings the band in contact with the edge of the cutter b and between said sliding grasper and the slightly-tilting spring-jaw b⁴, and when the needle is retracted the band occupies the position shown in Fig. 13. To advance and retract at the proper time the sliding grasper b³ there is pivoted to its rear end a lever b⁵, pivoted at b⁶ to an arm b⁷, pendent from the upper head b⁸ of the U-shaped frame. The upper end of the lever b⁵ is provided with a roller b⁹, that enters into the groove of a cam D⁶, secured upon the shaft D.

Figure 8:
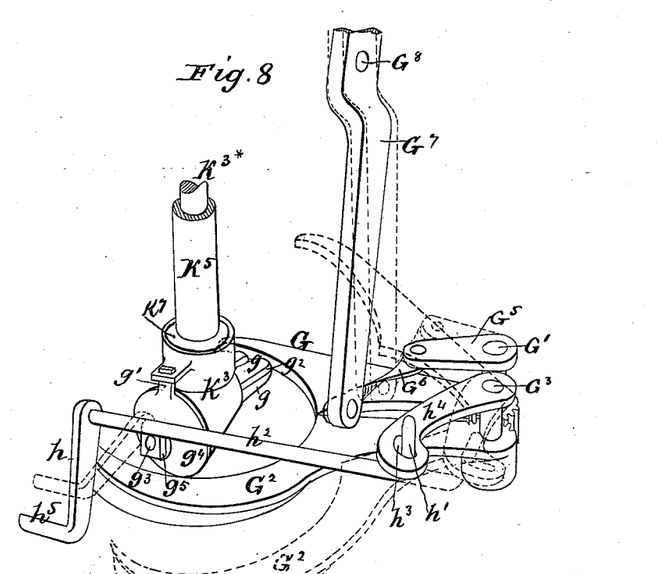
Fig. 8 is a perspective view of the lower portion of the knotter and knotting mechanism, showing more particularly the band-guiding device.
Figures 9, 10:
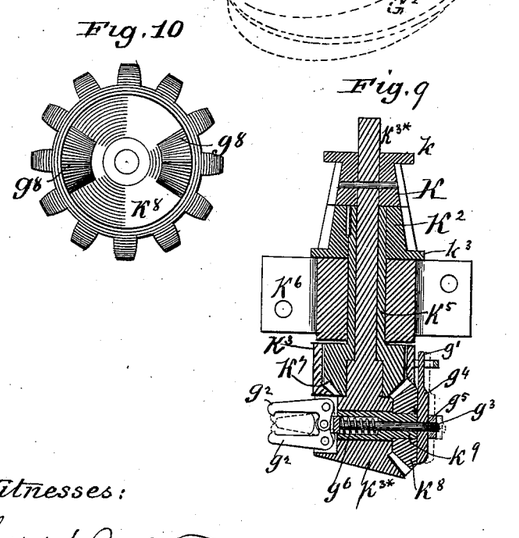
Figs. 9 is a vertical section of the knotter and knotter-box, showing the driving-gears. Fig. $9^a$ is a top view of the head $k$ of the top pinion of the knotter. Fig. $9^b$ is a bottom view of the head $k^3$ of the bottom pinion of said knotter.
Fig. 10 is a face view of one of the operating-gears.
Figure 9A:
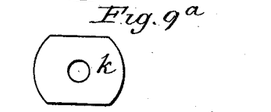
Figure 9B:
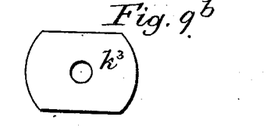
Figure 11:
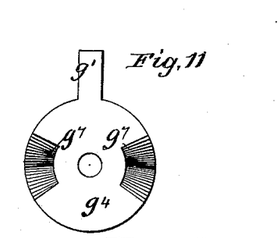
Fig. 11 is a lever-plate to operate the clamps of the knotter while the tuck is in progress.

When the end 6 of the band is first retained by the sliding grasper b³, it occupies a substantially horizontal position and passes over the trip-finger c and thence to the point of the needle, the latter being nearly even with the top of the platform. The grain is then packed against the band and causes it to bulge rearwardly. The pressure of the grain upon the band causes the band to slide off the trip-finger and enter between the branches g of the fork of the knotter. The needle advances then and gathers into the gavel any grain that may be in front thereof and at the same time conducts the end 7 of the band between the branches of the fork of the knotter and presses sufficiently against the end 6, already between the branches of the fork of the knotter, to allow the sliding grasper b³ to release the end 6 and be in position to receive the end 7—that is, the extremity thereof—in the hook of said sliding grasper, and said sliding grasper, being retracted by the mechanism heretofore described, presses the end 7 against the cutter b, and the latter cuts it in the position shown in Fig. 4. Before the knotter begins to revolve the band is prevented from slipping off from between the branches g of the fork of said knotter by means of a circular guard, preferably formed of three pieces lying in a horizontal plane passing through said fork. Two of these pieces are in the form of jaws, as shown at G G², Fig. 8. The jaw G is mounted upon a shaft G' and the jaw G² is mounted upon a shaft G³, and these shafts are retained in bearings formed in the breast-plate G⁴. The hubs of the jaws are provided with gear-teeth that mesh together, so that by operating the shaft of one of the jaws the other will also be operated. The shaft G' is the one that gives motion to both jaws, and to operate said shaft it is provided with a crank-arm G⁵, to which a part rotation is given by means of a connecting-rod G⁶, having one end pivoted to said crank-arm and the other end pivoted to the lower end of a lever G⁷, pivoted at G⁸ to the frame c⁸ and having its upper end provided with a roller that enters the groove of a cam G⁹, forming a part of the gear-wheel D². The jaw G closes immediately after the end 7 of the band has entered the knotter-fork and insures the entrance as well as the retention of the end of the band therein.

The third piece constituting the circular guard above mentioned is stationary and consists of an arm H. It has a segmental groove (shown dotted at H') in the under side to complete the circle of said guard. It lies in the same horizontal plane as the breast-plate G⁴ and is secured to said plate at one end. The other end is curved to form a guide H² to direct the band to the knotter-fork. The breast-plate G⁴ has a slot H³ therein for the passage of the needle-arm. To assist in retaining the knot produced in the band at the time that it is discharged from the knotter-fork and cause pressure of said band upon the grain at the point where a space temporarily occurs between said band and the grain (said space being caused by the withdrawal of the knotter-fork) and prevent the slipping of the parts 6 of the band back of the normal line of said band and assist said part 6 of the band to pass laterally and beyond the ends of the knotter-fork, a knot-holder h is used. The pendent arm h of said knot-holder is carried on the end of a horizontal rod h², carried in bearings upon the breast-plate G⁴, and the rear end h' of said rod is bent vertically and enters a slot h³ in the end of a crank-arm h⁴, mounted upon the shaft G³ of one of the arms of the circular knotter-guard. The lower end of the pendent arm h has a finger h⁵ at right angles thereto and parallel with the horizontal rod h² to press upon the band for the purpose stated. Said finger h⁵ is tilted into a nearly horizontal position by the jaw G². The slot h³ in the crank-arm h⁴ is to permit the jaw G² to partly open before said arm h⁴ begins to pull upon the rod h² and is used to retard the operation of the finger h⁵ until the jaw G² is sufficiently away from the knotter-fork. Immediately after the closing of the circular guard formed by the jaws G G² the teeth D³ on the face of the mutilated gear D² begin to engage with the two pinions K K² of the knotter and revolve them in the same direction and with the same speed and cause the knotter-fork to revolve horizontally and produce upon the ends of the band the one twist and a half shown in Fig. 5. After the end of the segment of teeth D³ has been reached the pinion K² continues to revolve on account of its engagement with the teeth of the segment D⁴ upon the mutilated gear D²; but the pinion K remains stationary, and this causes the knotter-fork to revolve upon its own axis, draw upon the band, and form the tuck of the knot under the band, as shown in rear view in Fig. 6 and in side view in Fig. 7.

To prevent the pinions K and K² from rotating after they have left their engagement with the cogs of the mutilated gear D², the pinion K has a rectangular head $k$ with two parallel surfaces, which are of proper size to travel upon the inner flange $k'$ of said gear and opposite the cogs D³ D⁵. Said flange is slotted at $k^2$ to permit said head $k$ to revolve when traveling opposite said cogs D³ and D⁵. The gear K² is provided with a head $k^3$, having two flat surfaces on opposite sides to similarly travel upon the outer flange $k^4$ and prevent said gear K² from rotating except when it is opposite the cogs D³ D⁴. To cause the ends of the band to be tucked directly under the knot and in the best position across the gavel, (in place of partly lengthwise,) there is projecting from the side of the bearing K³ of the shaft of the knotter-fork a hook K⁴, that receives the ends of the band and prevents them from dropping under said bearing K³ and directs them under the band immediately in front of said hook and under the point occupied by the tucked portion of the knot. To produce the twisting and tucking of the band above described, the knotter consists of a hollow shaft K⁵, retained nearly vertically in a bearing K⁶, secured to the frame $c^3$. To the upper end of said shaft is keyed the pinion K², and the lower end of said shaft carries or has formed integral therewith a bevel-pinion K⁷, that meshes with a bevel-pinion K⁸ upon the shaft K⁹, that carries the rigid branches $g$ of the fork of the knotter. Passing through the hollow shaft K⁵ and its pinion K⁷ there is a shaft K³*, that forms the upper end of the bearing K³*, to the upper end of which shaft is pinned the pinion K, and said upper end is received in a bearing in the upper branch of the knotter-box K⁶. To insure the retention of the ends of the grain band between the rigid branches $g$ of the knotter-fork while the latter are revolved to twist the ends of the grain band and tuck them under the band, each branch of the knotter-fork is longitudinally slotted and carries pivoted thereto bell-crank-shaped clamps $g^2$, having their outer ends slightly hooked, and their inner ends pivoted to one end of a rod $g^3$, passing longitudinally through the shaft K⁹, upon which is loosely mounted the lever-cap $g^4$, that is prevented from escaping from its place upon the rod $g^3$ by means of the nut $g^5$, screwed upon the end of said rod; but the lever-cap is retained in contact against the gear K⁸ only by the resilience of the spring $g^6$, coiled upon the rod $g^3$, as said spring bears at one end against the head of the rod and at the other end against a shoulder formed in the interior of the shaft K⁹. Upon the inner face of the lever-cap are formed two radial grooves $g^7$, and upon the rear of the gear K⁸ are formed two corresponding radial projections $g^8$, so that the parts $g^4$ K⁸ can be in close contact when the projection $g^8$ are within the recesses $g^7$, and the clamps $g^2$ are then open and in proper position to receive the band; but as the lever-cap $g^4$ is prevented from rotating by its stem $g'$ entering a slot in an arm projecting from the periphery of the bearing K³ or from a bushing attached to said bearing, and the pinion K⁸ is rotated when the straw band is tucked, it follows that while the pinion K⁸ makes a revolution the projection $g^8$ on said pinion travels upon the flat surface of the lever-cap and the clamps $g^2$ tightly hold the band inserted between them. When the pinion K⁸ has made a complete turn, the projections $g^8$ again fall into the recesses $g^7$ and the clamps $g^2$ become opened ready to release the knotted ends of the band.

After the ends of a straw band have been twisted together and tucked under the band, as shown in Fig. 6, and the band-clamps $g^2$ are opened, the revolving discharging-arms $f$ are pressing against the side of the bundle and move it in the direction of the arrow in Fig. 6, pulling the gavel off the fork with the band firmly knotted. When the gavel has been entirely separated from the knotter, the gear D², having continued to revolve its inner row of cogs D⁵, comes into engagement with the pinion K and gives it a half-turn, which places the knotter-fork back into position to receive the band for a new gavel. To operate the discharging-arms $f$, their shaft F carries at one end a pinion $f^2$, that meshes with another pinion $f^3$, mounted upon a stud $f^4$, carrying a sprocket-wheel $f^5$, that obtains its motion from a sprocket-wheel $f^6$ upon the shaft D.

To keep the straw band R from backing toward the band-making mechanism when the tension-lever of said mechanism is pulling on the band, a retaining-pawl $i$ is pivoted to the elevator-frame directly over the band, and a rigid lug $i^2$ supports the band at that point.

The top of the binder-frame is connected with the top of the elevator-frame by means of a swinging brace or rod I to hold the binder in position in case of undue strain.

Having now fully described my invention, I claim—

1. In combination with the binding platform of a harvester having slots therein a crank shaft and a rod $a^6$ under said platform and forming an angle therewith the packer arms having an eye at each end and an upward bend between the two ends substantially as and for the purpose described.

2. In combination with the binding platform of a harvester a U shaped frame consisting of two series of horizontal tubes B³ B⁵, a series of vertical tubes B⁴ and bearing castings uniting the series of horizontal tubes to the series of vertical tubes, and a vertical tube B⁸ constituting a chord within the arc of the U shaped frame, and a bolt passing through said tube B⁸ substantially as and for the purpose described.

3. In combination with the head of a U shaped frame the breast plate and the trip finger mounted on top of said breast plate upon the lower end of a shaft at right angles to said breast plate, the finger of said trip being in the path of the grain band, to the band-holding and twisting devices and mechanism of a grain binder suspended from said head substantially as described.

4. The combination of the head of a U shaped grain binder frame, the breast plate G⁴ suspended from said head, the stationary cutter $b$, the sliding grasper $b^3$ and the yieldingly tilting jaw $b^4$ having a spring carrying pin $b^{14}$ passing through the breast plate and a spring upon said pin and having one end resting upon said breast plate substantially as described.

5. The combination of the head of a U shaped frame, the breast plate G⁴ suspended from said head the knotter-fork, the trip finger $c$ adapted to swing horizontally upon said breast plate in front of the knotter fork in the path of the band to be operated thereby, substantially as and for the purpose described.

6. The combination of the head of a U shaped frame, the breast plate G⁴ suspended from said head, the shaft C, the pinion C⁴ loose on said shaft and carrying one member of a clutch, the sleeve C⁵ secured upon said shaft, the clutch lever C⁸ the latch C⁹ and gear D² having an inclined plane $d$ within said gear, with the adjustable connecting rod $c^3$, the crank shaft $c^5$ and the trip finger $c$ adapted to swing horizontally upon said breast plate substantially as and for the purpose described.

7. The combination of a band carrying needle pivoted under a binding platform, a breast plate suspended from the head of a U shaped frame, a sliding band grasper above said breast plate, knotter jaws in front of said band grasper, the arm H having a curved end H² and a horizontally swinging trip finger in front of said knotter jaws whereby the end 6 of a band carried by said needle is passed from the gripper horizontally over the trip and the accumulation of the grain against the band causes said band to first swing the trip finger horizontally, and causes the knotting mechanism to start substantially as described.

8. The combination of the head of a U shaped frame, the breast plate G⁴ suspended therefrom, the band carrying needle pivoted under the binding platform, its shaft E² provided with a crank off-set E′ wider than the needle arm and adapted to extend above said platform substantially as and for the purpose described.

9. The combination of the binder platform, a U shaped frame resting thereon, a breast plate suspended from the head of said frame and a take-up under the binder platform said take-up consisting of a crank arm E³ upon the needle shaft, the connecting rod E⁶ having one end pivoted to the crank arm E³, the lever E⁷ pivoted at one end to the platform, the connecting rod $e^2$ pivoted to said lever and take up lever $e^3$ pivoted to the under side of the platform and having a pulley at the outer end thereof substantially as described.

10. The combination of the binder platform, a U shaped frame resting thereon a breast plate suspended from the head of said frame, the fork of the knotter, and the knotter guard consisting of two pivoted jaws and an arm H recessed at H′ to encircle the knotter fork while the latter is forming the knot substantially as described.

11. The combination of a U shaped frame, the breast plate G⁴ suspended from said head and having a slot H³ closed at both ends, the arm H extending in said slot parallel therewith and having its free end H² curved, whereby the end 7 of the band is directed from the needle to the knotter-fork, substantially as described.

12. The combination of the knotter-fork its guard jaws G G² the latter having the vertical shaft G³ the arm $h^4$ slotted at its outer end, the rod $h^2$, crank arm $h$ and fingers $h^5$ substantially as described.

13. The knotter consisting of the hollow shaft K⁵ having the bevel gear K² at its upper end and the bevel gear K⁷ at its lower end, the central shaft K³ having the gear K at its upper end and the bearing for the shaft K⁹ the knotter fork at its lower end and the gear K⁸ upon said shaft, the shaft $g^3$ and spring $g^6$ therein and the lever-cap $g^4$ upon said shaft with the mutilated gear D² meshing with gears at the upper end of the knotter substantially as described.

14. In combination with the shaft D carrying the mutilated gear D², gavel discharging arms secured to a shaft F journaled to the binder platform, the needle under said platform the gear $f^2$ upon said shaft F, the gear $f^3$ meshing therewith, the sprocket wheels $f^5$ $f^6$ and chains uniting them substantially as described.

15. A rotary discharger pivoted under the platform in combination with the off-set in the shaft of the needle arm to present a broad bearing for the bundle said off-set being in the path of the discharger substantially as described.

16. The combination of the revolving shaft and bearing K³, the shaft K⁹ carrying the knotter fork each branch of which is longitudinally slotted, the band clamps $g^2$ pivoted to said branches and having their inner end hinged to a rod $g^3$ adapted to be retracted substantially as described.

17. The combination of the breast plate G⁴ having a longitudinal slot therein closed at both ends and an arm H extending in said slot and having its free end $H^2$ curved, the knotter fork, the rod $h^2$ alongside of said knotter fork and provided with a crank $h$ at one end, and means substantially as described connected with the opposite end whereby said rod $h^2$ and its crank are rocked and reciprocated substantially as set forth.

In testimony whereof I affix my signature in presence of two witnesses.

HOSMER TUTTLE.

Witnesses:
E. E. MASSON,
HARRY L. AMER.